(12) United States Patent
Frison

(10) Patent No.: US 11,337,382 B2
(45) Date of Patent: May 24, 2022

(54) LIGHTING INSTALLATION AND CORRESPONDING METHOD

(71) Applicant: OSRAM GmbH, Munich (DE)

(72) Inventor: Renato Frison, Chions (IT)

(73) Assignee: OSRAM GmbH, Munich (DE)

( * ) Notice: Subject to any disclaimer, the term of this patent is extended or adjusted under 35 U.S.C. 154(b) by 920 days.

(21) Appl. No.: 16/008,134

(22) Filed: Jun. 14, 2018

(65) Prior Publication Data
US 2018/0363884 A1 Dec. 20, 2018

(30) Foreign Application Priority Data

Jun. 16, 2017 (IT) .................. 102017000067055

(51) Int. Cl.
*A01G 9/24* (2006.01)
*A01G 7/04* (2006.01)
(Continued)

(52) U.S. Cl.
CPC ............ *A01G 9/249* (2019.05); *A01G 7/045* (2013.01); *A01G 9/20* (2013.01); *F21V 5/007* (2013.01); *F21V 5/04* (2013.01); *F21V 5/08* (2013.01); *F21V 7/05* (2013.01); *F21V 13/04* (2013.01); *F21Y 2103/10* (2016.08); *F21Y 2113/13* (2016.08); *F21Y 2115/10* (2016.08)

(58) Field of Classification Search
CPC .......... F21V 13/04; F21V 5/007; F21V 5/014; F21V 7/05; F21Y 2103/10; F21Y 2113/13
See application file for complete search history.

(56) References Cited

U.S. PATENT DOCUMENTS

| 7,348,723 B2 | 3/2008 | Yamaguchi et al. |
| 8,382,338 B2 | 2/2013 | Lee |
| (Continued) | | |

FOREIGN PATENT DOCUMENTS

| CA | 1285389 C | 7/1991 |
| CA | 2700790 A1 | 7/2011 |
| (Continued) | | |

OTHER PUBLICATIONS

Italian Search Report based on application No. 2017000067055 (9 pages) dated Feb. 13, 2018 (for reference purpose only).
(Continued)

*Primary Examiner* — Anabel Ton
(74) *Attorney, Agent, or Firm* — Viering, Jentschura & Partner mbB

(57) ABSTRACT

An installation such as, for example, a box or cabinet for horticultural applications includes a lighting space between a lighted plane and a lighting plane parallel to the lighted plane, with side walls that are at least partly light-reflective. The illuminated plane may be defined by the upper surface of a plant culture medium. A set of light radiation sources, e.g. LEDs, arranged centrally relative to the lighting plane projects light radiation towards the lighted plane in the direction of a radiation emission axis. The set of light radiation sources emits light radiation with a distribution of illuminance projected towards the lighted plane, wherein the lighted plane is non-uniform and gradually decreases as a function of the angle relative to the aforesaid radiation emission axis, wherein the reflection of the radiation on the side walls facilitates uniform illuminance at the lighted plane.

19 Claims, 8 Drawing Sheets

(51) Int. Cl.
*A01G 9/20* (2006.01)
*F21V 13/04* (2006.01)
*F21V 5/00* (2018.01)
*F21V 5/04* (2006.01)
*F21V 5/08* (2006.01)
*F21V 7/05* (2006.01)
*F21Y 113/13* (2016.01)
*F21Y 103/10* (2016.01)
*F21Y 115/10* (2016.01)

(56) References Cited

U.S. PATENT DOCUMENTS

| | | |
|---|---|---|
| 2005/0135104 A1 | 6/2005 | Crabb et al. |
| 2006/0066218 A1 | 3/2006 | Yamaguchi et al. |
| 2008/0148630 A1 | 6/2008 | Ryan et al. |
| 2009/0225543 A1 | 9/2009 | Jacobson et al. |
| 2011/0164426 A1 | 7/2011 | Lee |
| 2011/0317432 A1 | 12/2011 | Lee |
| 2012/0198762 A1 | 8/2012 | Lee |
| 2017/0020084 A1 | 1/2017 | Alfier et al. |
| 2017/0094914 A1 | 4/2017 | Paquette |

FOREIGN PATENT DOCUMENTS

| | | |
|---|---|---|
| CN | 202403119 U | 8/2012 |
| CN | 103609353 A | 3/2014 |
| CN | 204616536 U | 9/2015 |
| CN | 205124549 U | 4/2016 |
| CN | 105815224 A | 8/2016 |
| CN | 205454938 U | 8/2016 |
| CN | 106369293 A | 2/2017 |
| CN | 106538292 A | 3/2017 |
| CN | 106545788 A | 3/2017 |
| EP | 1117894 B1 | 12/2003 |
| EP | 1112433 B1 | 1/2004 |
| KR | 101619461 B1 | 5/2016 |
| WO | 2016037950 A1 | 3/2016 |
| WO | 2017060800 A1 | 4/2017 |

OTHER PUBLICATIONS

Chinese Search Report for Application 201810614135.5, dated Nov. 26, 2021, 9 pages (for informational purposes only).
Chinese Office Action issue for the corresponding Chinese patent application No. 201810614135.5, dated Jun. 22, 2021, 9 pages (for informational purposes only).
Chinese first search repod issue for the corresponding Chinese patent application No. 201810614135.5, dated Jun. 11, 2021, 4 pages (for informational purposes only).

LIGHTING INSTALLATION AND CORRESPONDING METHOD

CROSS-REFERENCE TO RELATED APPLICATION

This application claims priority to Italian Patent Application Serial No.: 102017000067055, which was filed Jun. 16, 2017, and is incorporated herein by reference in its entirety and for all reasons.

TECHNICAL FIELD

The description refers to lighting installations.

One or more embodiments may be used in horticultural applications (cultivation of vegetable, e.g. plants), for example, in domestic contexts. The reference to this possible application context should not be taken as limitative of the embodiments

BACKGROUND

Various lighting installations of limited size or, in general, in contexts in which a distribution of lighting points is provided (for example, horticultural applications in a domestic environment) may envisage the use of Solid State Lighting (SSL) sources such as LED sources.

These applications share aspects of general technical lighting applications, such as those linked to the possibility of providing a good light distribution on an illuminated surface, for example of a rectangular shape, easily and at a low cost.

In the case of horticultural applications (indicating—with this name—in general, applications related to the growth of vegetables, e.g. plants), an additional complexity factor derives from the fact that—in this context—it is possible to use light radiation sources (for example, LEDs) of different types, for example, with different emission spectra, grouped and driven separately. It is therefore desirable to be able to obtain a uniform light distribution even within the scope of each type of source used (for example, for all the LED sources that emit in a certain emission field).

Still referring to horticultural applications, the lighting sources (for example, LEDs and optical devices associated with them) may be arranged in a container ("cabinet") such as a box or crate where plants are cultivated under controlled environmental conditions (e.g. regarding lighting, color distribution, as well as humidity and temperature values).

In these applications it is desirable to be able to achieve—in this plane—a distribution that is as uniform as possible in terms of illuminance (also regarding the color). Illuminance is a photometric quantity that expresses the relationship between the luminous flux that impacts on a surface element about a point and the area of the element itself. Illuminance may be obtained by the relationship between the luminous flux emitted by a source and the surface area of the illuminated region.

Using one or more distributed arrays of lighting sources, e.g. LEDs, which may include LEDs of different types, it is possible to achieve uniform illuminance by using a single lens for each LED, or by using a single optic for a certain assembly or cluster of LEDs (for example, a reflector), with the effect of producing a shaping action of the lighting beam sent towards the illuminated surface (for example, of a rectangular shape). A certain array of LEDs and optical elements may be reproduced and coupled to other similar structures, and thus may illuminate a larger surface area Lenses capable of providing an emission distribution capable of uniformly illuminating a flat surface are known, for example, for back-lighting applications, to create a uniform flat illuminance field on a display (such as those used in screens for televisions, computer displays, smartphones or tablets).

Documents such as U.S. Pat. No. 8,382,338 B2 or U.S. Pat. No. 7,348,723 B2 may exemplify systems using asymmetrical lenses to uniformly illuminate a flat viewer. These optical systems (lenses) may be arranged very close to the illuminated surface, so that the contributions of the back-reflected light on the side walls are disregarded.

Boxes or cabinets for applications such as horticultural applications discussed above may have dimensions that are not much larger than those of lighting devices (for example, with proportionality factors between 10 and 20). Consequently, the light reflected from the walls of the container onto the control plane (the one in which the culture medium is arranged) is not negligible, in order to achieve an illuminance distribution as uniform as possible at the plane.

In such an application context, the component reflected by the walls is not negligible: using—in this context—lens devices with the optical characteristics described in the two patent documents cited above, the illuminance distribution resulting on the culture plane would be anything but flat and uniform.

SUMMARY

One or more embodiments may aim to contribute to provide improved solutions in relation to various aspects outlined above.

According to one or more non-limiting embodiments, this object may be achieved thanks to a lighting installation having the characteristics referred to in the following description.

One or more non-limiting embodiments may concern a corresponding method of manufacturing or design: the patentability of the design methods may be attested by documents such as EP 1 112 433 B1 or EP 1 117 894 B1.

The claims form an integral part of the technical discussion provided here in relation to the embodiments.

One or more non-limiting embodiments allow the reflection contribution of the walls to be taken into account, correspondingly adapting the shape of the lenses (for example, by rendering them asymmetrical, for example, according to the dimensions of the illuminated "box"), improving the uniformity of illuminance on the reference plane (culture plane), also improving color uniformity by playing with the location of light radiation sources (including lenses).

For example, in one or more non-limiting embodiments, it may be possible to perform the following steps:
  applying a "free-form" asymmetric lens profile, associated with LEDs, with the shape of the modeled lens such as to give rise to an illuminance distribution which, considered on a reference plane placed at a certain distance from the lens (in a situation in which it is assumed that no side walls are present), gradually decreases (smoothly) and
  arranging the individual lighting sources in an array e.g. linear or matrix.

One or more non-limiting embodiments may offer one or more of the following advantages:
  greater efficiency thanks to an adequate uniformity of the light distribution on an illuminated surface, for example rectangular, greater uniformity of the illuminance and color on the control plane with the use of an asymmetrical lens profile, containment of the related costs, e.g. the possibility of i) using a single type of shaped lens components for the lighting sources (for example LEDs) in an array, ii) making standard couplings of the mechanical parts and shaped lenses, and iii) obtaining protection against the penetration of external agents (for example IP degree) due to standard couplings of the mechanical parts with the components of shaped lenses, possibility to "customize" the lenses as a function of the distances of the single lens from the walls of the lighted space with improvement of the uniformity of color and illuminance, possibility of implementing a further customization of the lenses according to the different reflectivity characteristics of the walls of the illuminated space, also in this case with the possibility of improving the uniformity of the color and illuminance, possibility of further improving these characteristics by means of the solution of misaligning some of the lighting sources in the array so as to change the output angles of the beam, achieving an improvement in the uniformity of color and illuminance, while maintaining the same lens element.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

It will be appreciated that, for clarity and simplicity of illustration, the views in the various figures may not be reproduced on the same scale.

DETAILED DESCRIPTION

The following description illustrates various specific details, in order to provide a thorough understanding of various examples of embodiments. The embodiments may be obtained without one or more of the specific details, or with other methods, components, materials, etc. In other cases, known structures, materials or operations are not illustrated or described in detail so that the various aspects of the embodiments and not rendered unclear.

The reference to "an embodiment" in the context of the present description indicates that a particular configuration, structure or characteristic described in relation to the embodiment is included in at least one embodiment. Thus, sentences such as "in an embodiment", which may be present at various points in the present description do not necessarily refer to exactly the same embodiment. Moreover, particular configurations, structures or characteristics may be combined in any convenient way in one or more embodiments.

The references used herein are provided simply for convenience and therefore do not define the field of protection or scope of the embodiments.

Figure 1:
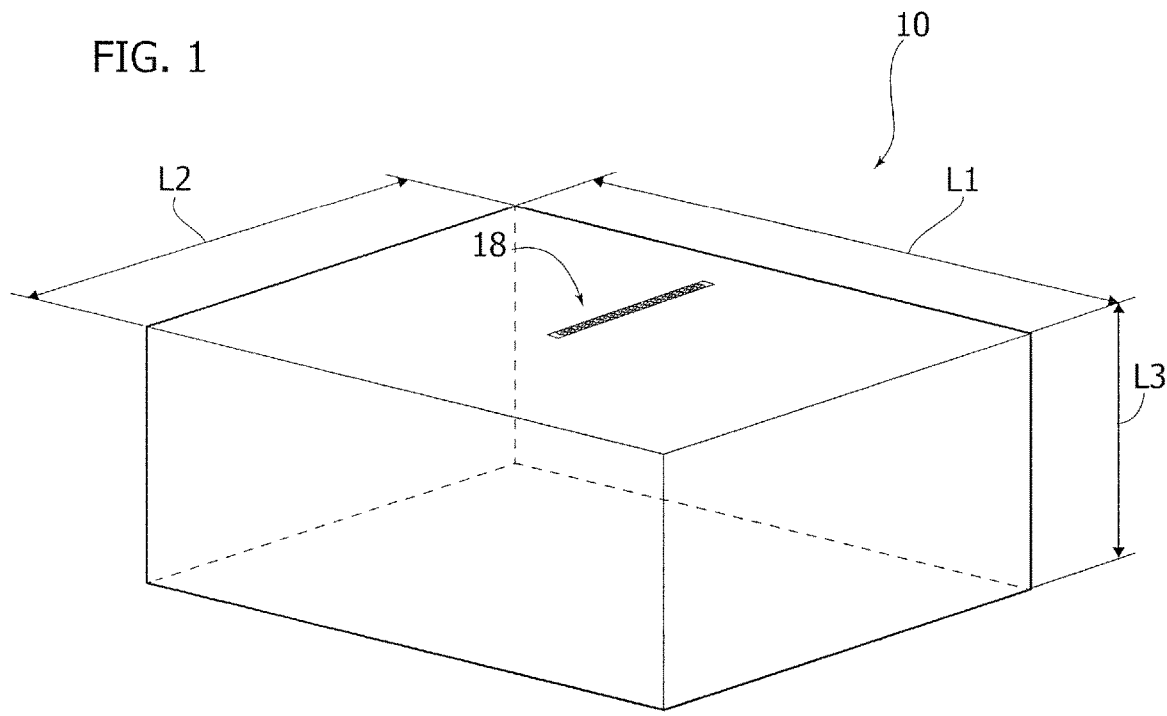
FIGS. 1 and 2 are perspective views that exemplify a possible context of use of one or more embodiments, FIG. 3 schematically illustrates light radiation sources that may be used in embodiments.
Figure 2:
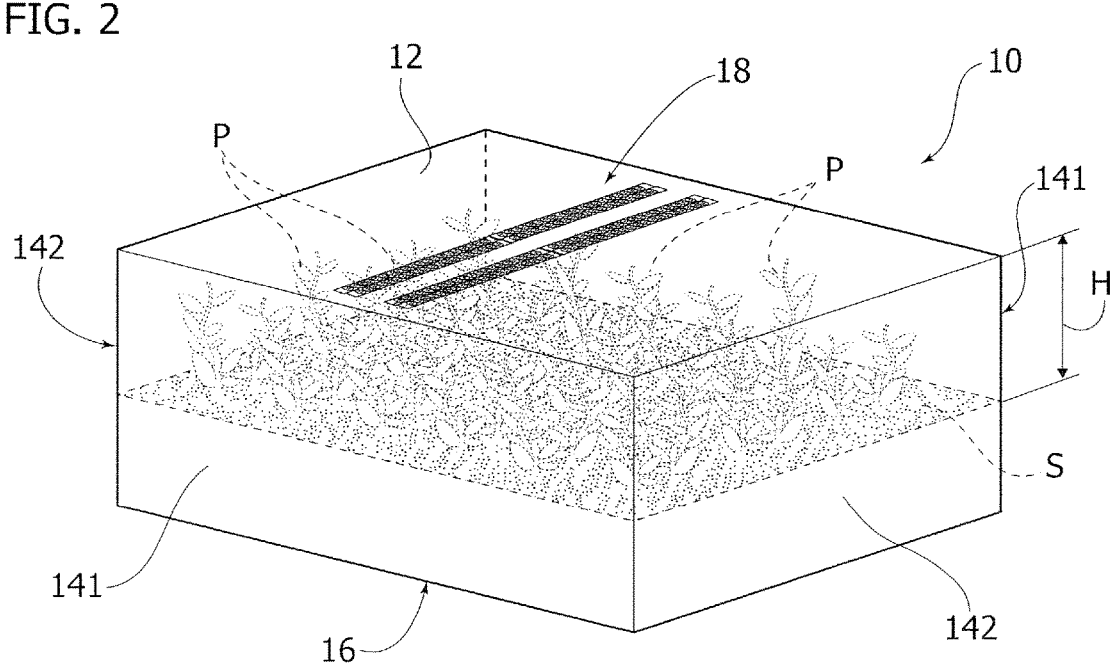

FIGS. 1 and 2 illustrate possible non-limiting characteristics of a lighting installation usable, for example, for horticultural applications to promote the growth of plants.

In one or more non-limiting embodiments, the installation 10 comprises a parallelepiped space capable of presenting, for example, dimensions in the order of 500 mm (length L1) by 400 mm (width L2) by 200 mm (height L3). The quantitative values presented here are, of course, merely a non-limiting example of the embodiments.

In one or more non-limiting embodiments, such a space may be defined, for example, as a "cabinet" or crate or culture box in which plant culture material (e.g., soil suitable for planting) may be arranged.

As exemplified in FIG. 2, such a cabinet may therefore comprise:

an upper wall (or "ceiling") 12,
a first pair of (major) sides or walls 141, opposite and parallel to each other,
a second pair of (minor) sides or walls 142, opposite and parallel to each other, and
a bottom wall 16.

The installation exemplified in FIG. 2 may comprise light radiation sources (e.g., LEDs) at an array 18 (e.g., linear or matrix) mounted on the upper wall 12 of the box (according to the designation used in the remainder of the present description for brevity) so as to project the light radiation from the top towards the bottom onto the culture plane, indicated with S, in which plants P may be present.

The plane S (at which an illuminance as uniform as possible is required) extends substantially parallel to the bottom wall 16 of the box, for example, at a distance H in the order of 120 mm from the upper surface 12: also in this case it is a purely exemplifying value, not a limitation of the embodiments.

In one or more embodiments, the array 18 of light radiation sources may be placed at the central area of the upper wall 12 so as to illuminate the surface S from above starting from a central position.

The inner surfaces of the side walls 141, 142 (for now for simplicity it will be assumed that this applies to all the walls) may exhibit reflectivity characteristics with respect to the light radiation, causing part of the radiation emitted from the sources 18 to arrive on the plane S after being reflected from the side walls 141, 142.

The reflectivity characteristics of the light of the walls 141, 142 may be reasonably assumed to be of the Lambertian type, for example, assuming that the (inner surfaces of the) side walls 141, 142 have a white color with reflectivity in the order of 80%; of course these are purely exemplary and non-limiting values of the embodiments.

In one or more non-limiting embodiments, the light radiation sources of the array 18 may comprise electrically-powered light radiation generators 100, such as, for example, solid state generators, such as LEDs, with which respective lenses 102 may be associated.

In horticultural applications, provision of the use of light radiation sources with different emission characteristics is known, e.g. light radiation sources that emit in different regions of the electromagnetic spectrum, for example, in the red region and in the blue region (see, by way of a non-limiting example, documents such as WO2017/060800 A1).

For present purposes, it may be assumed that the illuminance (and color) uniformity objects are intended to be achieved (also) within each set of light radiation sources of a given type (e.g. light radiation sources that emit radiation with a certain color).

Figure 3:
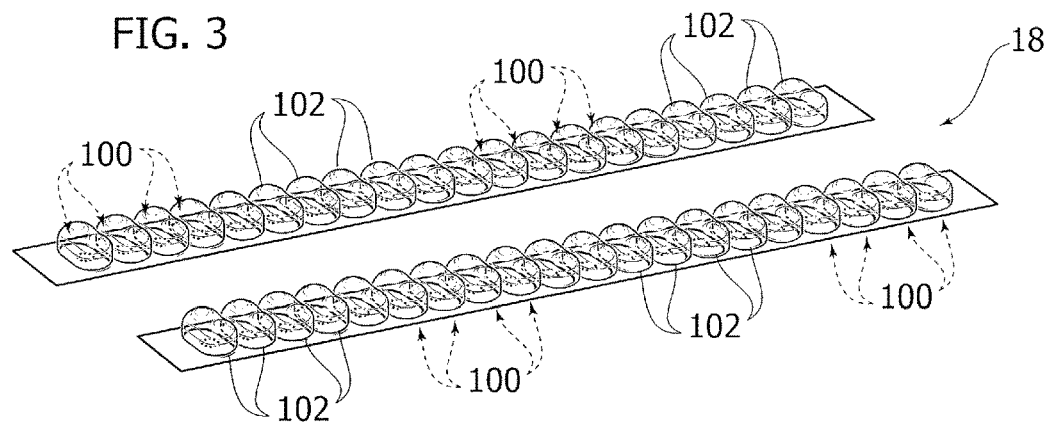

FIG. 3 illustrates an array 18 of light radiation sources comprising, for example, two lines or rows of light radiation generators (for example LEDs) 100 which, in one or more embodiments, may be associated with lenses 102 having the characteristics better illustrated with reference to FIGS. 4 to 6.

The representation of FIG. 3 (array 18 comprising two lines or rows of sources 100, 102) is purely exemplary. One or more embodiments may, in fact, use only one linear array of light radiation sources. Likewise, other embodiments may use arrays comprising more than two lines or rows of light radiation sources. Furthermore, in one or more embodiments, it is possible to use arrays of different conformation.

Figure 4:
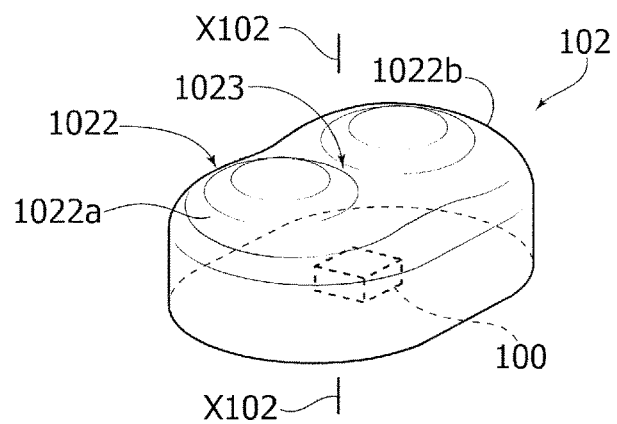
FIG. 4 is a perspective view of a lens that may be used in embodiments.
Figure 5:
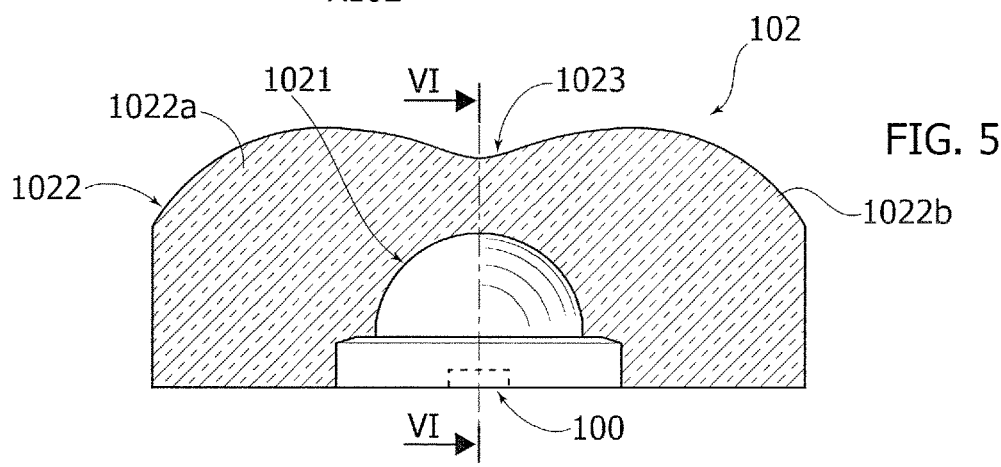
FIGS. 5 and 6 are cross-sectional views of the lens of FIG. 4 according to planes corresponding to the line VI-VI of FIG. 5 (view of FIG. 6) and to the line V-V of FIG. 6 (view of FIG. 5), respectively, FIGS. 7 to 10, in which FIGS. 9 and 10 each comprise three portions indicated, respectively, with a), b) and c), are illustrative diagrams of light emission characteristics, FIGS. 11 to 13 exemplify possible lens production criteria as illustrated in FIGS. 4 to 6, FIGS. 14 to 17 contain exemplary diagrams of criteria for implementing embodiments.
Figure 6:
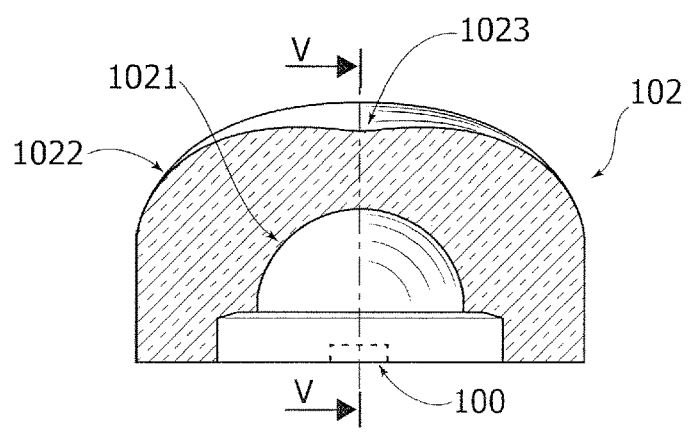

In one or more embodiments, lenses such as the lens 102 exemplified in FIGS. 4 to 6 may appear as "asymmetrical" lenses (in the sense that they do not have—as a whole—the rotational or cylindrical symmetry of traditional lenses).

In one or more embodiments, a lens 102, as exemplified in FIGS. 4 to 6, may have an input surface 1021 and an output surface 1022 (input and output of the light radiation), with a concave input surface 1021 (for example, with a dome shape) designed to be directed towards the associated radiation generator (for example LED) 100.

In one or more non-limiting embodiments, the surface 1021 may be in contact with the generator 100, or may be separated from it by an air space (as in the example presented here).

Regarding the choice of materials, in one or more non-limiting embodiments, lenses such as the lens 102 exemplified in FIGS. 4 to 6 may be made of a plastic material (polycarbonate or polymethyl methacrylate, for example) or of glass.

The choice of materials of the type cited as examples (or similar materials) allows configuration of both the input surface of the lens 1021 (facing towards the generator 100) as well as the output surface 1022 (opposite to the generator 100) as lenses described as having "free-form" bi-dimensional profiles.

As described below, these surfaces may be optimized so as to facilitate the achievement of a uniform illuminance distribution on the surface S (FIG. 2) placed in front of the lenses 102 at a certain distance, and perpendicular to the optical axis of the LED.

As below, one or more embodiments aim to take into account the reflection effect of the walls 141, 142, aiming to produce the lens 102 in such a way that the illuminance distribution (and color) on the plane S:

is different from a uniform distribution if the effect of the lens outside the ideal space of the box 10 is considered, that is, assuming—so to speak—that the side walls 141, 142 are not there;

instead becomes a uniform distribution if the effect of the lens in the real space of the box 10 is considered, that is to say, if we take into account that the side walls 141, 142 are there, with their reflecting effect.

In one or more non-limiting embodiments as exemplified in FIGS. 4 to 6, the lens 102 may have a bilobed shape with (markedly) different cross-sectional profiles in two cross-sectional planes mutually rotated by 90°: see, for example, the cross-sectional planes of FIGS. 5 and 6.

This asymmetric conformation allows a uniform illuminance on the plane S to be achieved which, as exemplified herein, may be assumed to have a rectangular shape.

In one or more non-limiting embodiments, the lens 102 may have a domed input surface 1021, with the output surface 1022 comprising a pair of raised (convex) portions 1022*a*, 1022*b* separated by an intermediate concavity 1023.

In one or more non-limiting embodiments, the concavity 1023 may be aligned with the input surface 1021 at a central main axis X102 of the lens 102.

This axis (capable of being aligned with the direction along which the sources 100, 102 emit the light radiation towards the illuminated plane S) is shown in FIG. 4 and may be seen as corresponding to the intersection axis between the V-V and VI-VI cross-sectional planes of FIGS. 5 and 6.

In one or more non-limiting embodiments (as appreciable, for example, by the combined observation of FIGS. 2 and 3), it is possible to envisage that the lenses 102 are mounted in such a way whereby their direction of greatest extension (i.e. the alignment direction of the two convex portions 1022*a*, 1022*b*) is aligned with the major sides 141 of the box 10.

While in the embodiments exemplified in the figures it is assumed that the sides 141 are longer than the sides 142 (L1>L2), one or more embodiments may envisage the use of boxes 10 in which (L1<L2), and the use of boxes 10 in which the two pairs of sides 141, 142 have the same length (L1=L2) with the surface of the plane S being square, therefore, with the box 10 having a parallelepiped shape with a square plan cross-section.

In one or more non-limiting embodiments, lenses such as the lens 102 allow "shaping" of the conformation of light radiation emitted by the radiation generators (for example, LEDs) 100 gradually (smoothly) so as to achieve a uniform distribution on the plane S, taking into account the reflecting effect of the walls 141, 142.

Using a plurality of generators, for example, LEDs 100, each provided with a lens 102 as illustrated here, arranged in a linear or matrix array, it is possible to obtain good uniformity of illuminance and color on the plane S, also using generators 100 having wavelengths of different peaks (for example, deep red, red, blue and white).

The luminous fluxes starting from each generator 100 may, in fact, be expanded by the respective lens 102 so that the illuminance distribution (and, consequently, color) obtained, starting from each lens, is superimposed on the plane S, facilitating the obtainment of a uniform lighting of high quality and uniform color.

Figure 7:
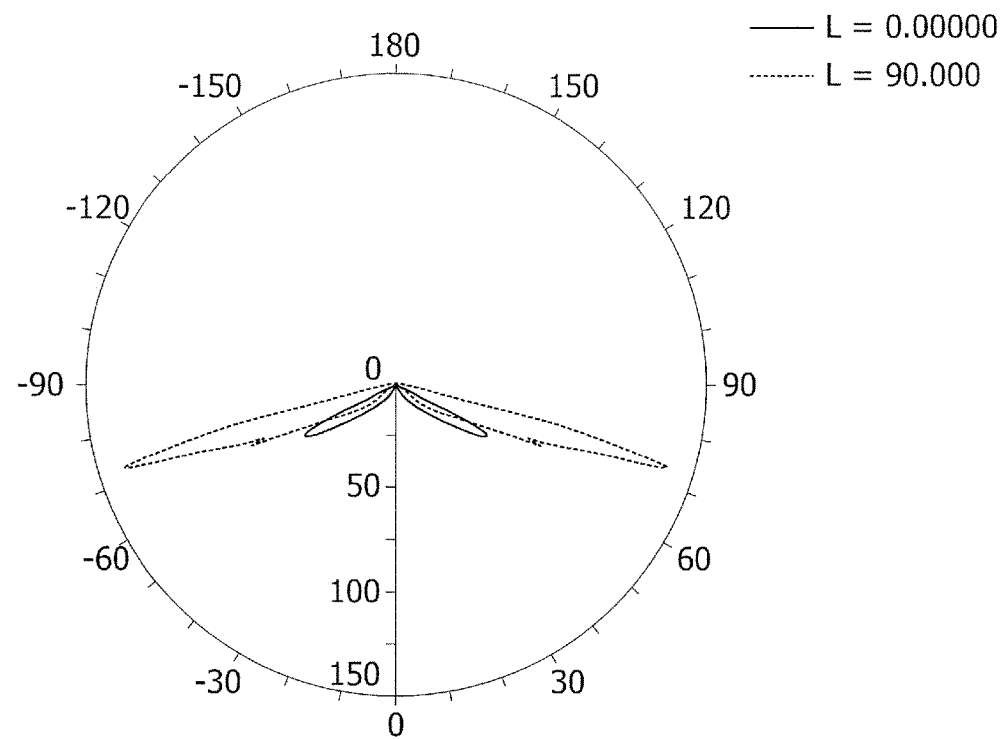
Figure 8:
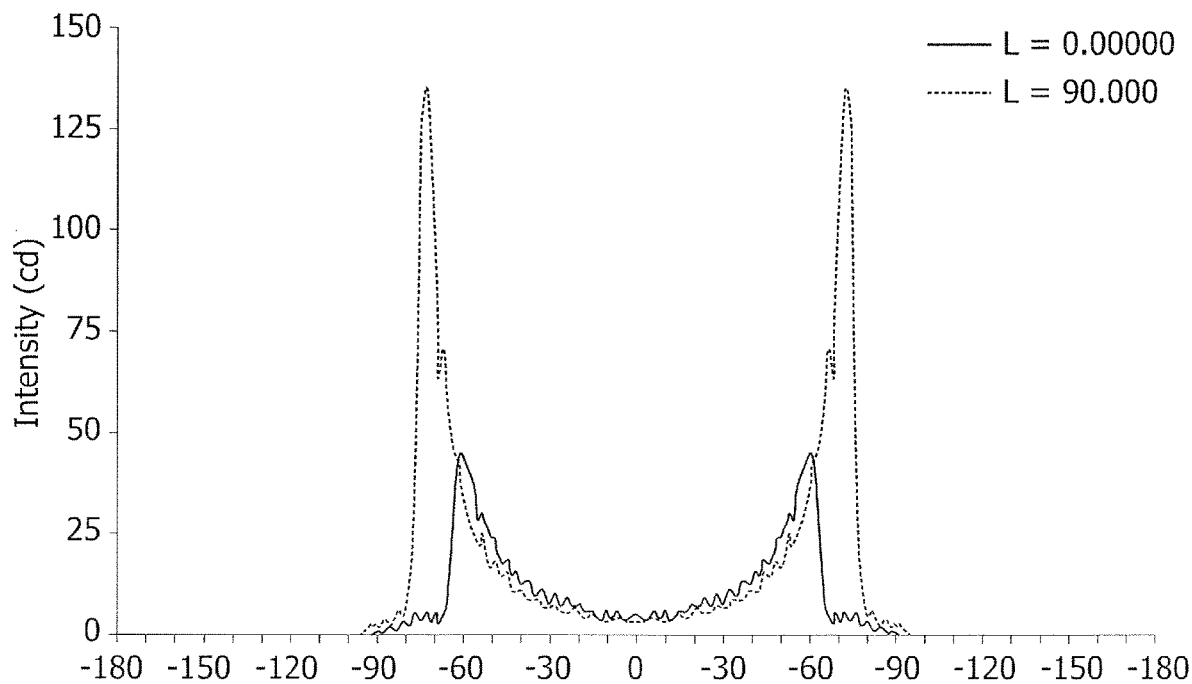

The diagrams of FIGS. 7 and 8 exemplify possible characteristics of the light intensity distribution (Intensity—scale of the ordinate of FIG. 8) obtainable through lenses 102 such as those illustrated above.

In particular, the diagrams of FIGS. 7 and 8 illustrate the characteristics of the light radiation distribution obtainable with a lens 102 (assuming reference to generators 100, such as LEDs, having—at their output—a substantially Lambertian light radiation distribution), which may present two side peaks in two orthogonal planes (L=0° and L=90°, corresponding in practice to the cross-sectional planes of FIGS. 5 and 6).

Figure 9:
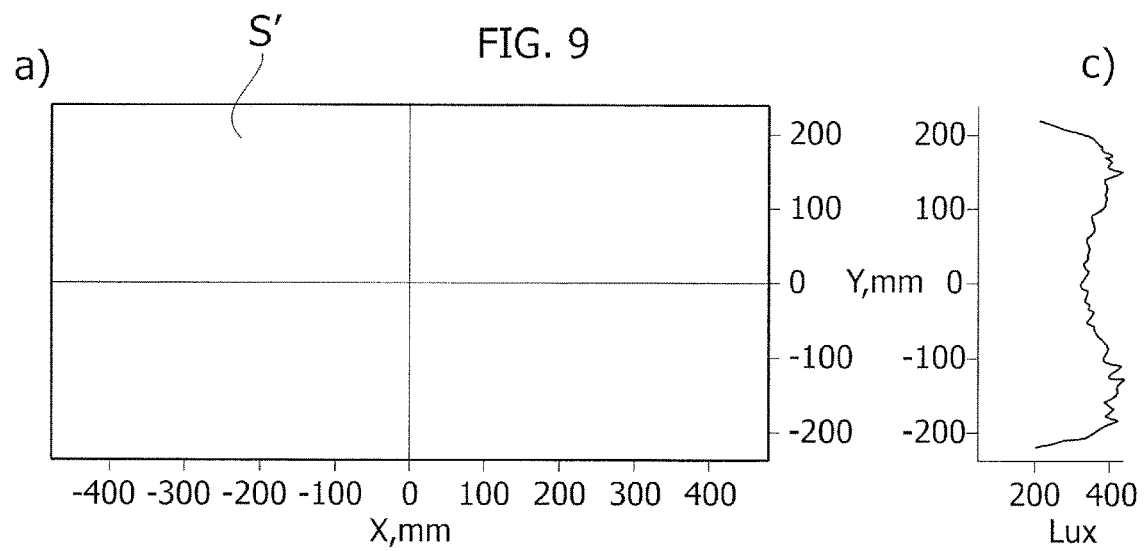
Figure 9:
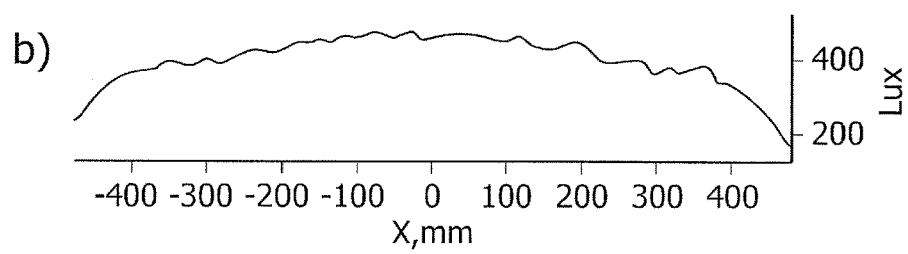
Figure 10:
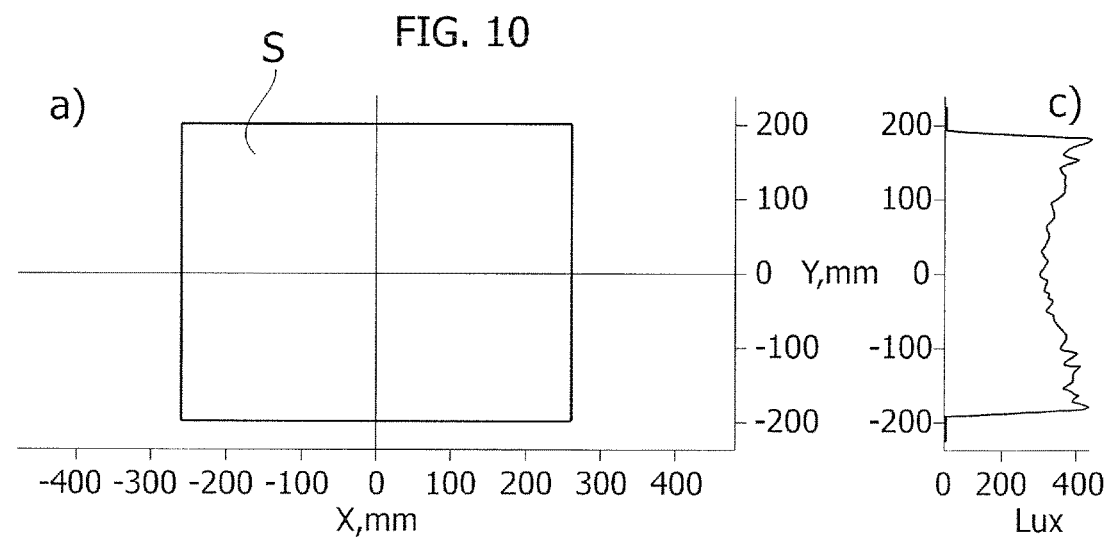
Figure 10:
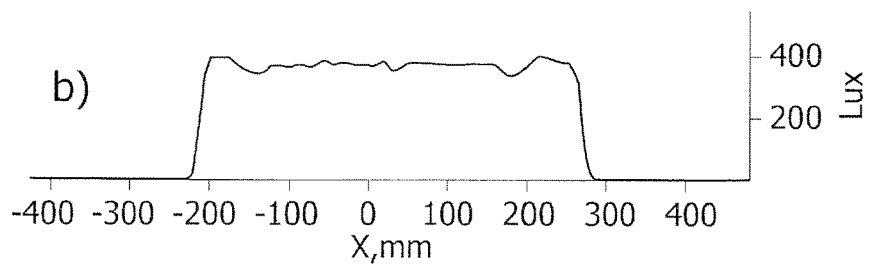

The possible effect of the use of such a distribution is exemplified in FIGS. 9 and 10.

FIG. 9 exemplifies possible illuminance trends (in Lux) according to two orthogonal directions X and Y in an ideal plane S' placed at the same distance of the plane S but assuming to operate "out" from a box like the box 10 of FIGS. 1 and 2, i.e. assuming that the walls 141, 142 are not there.

As may be seen by looking at the diagrams of parts b) and c)—referring, respectively, to the X and Y dimensions of the ideal plane S' represented in part a) of the same figure—the aforesaid intensity distribution is not uniform in either of the directions X, Y.

FIG. 10 instead illustrates the effect achievable on the plane S using a light intensity distribution as may be achieved with a lens 102 (assuming, for simplicity, reference to a single lighting distribution positioned at the center of the upper wall 12 of the box 10) if also taking into account the reflective effect of the side walls 141, 142.

As appreciable in comparison with FIG. 9, the overall result on the reference plane S, represented in part a) of FIG. 10, is markedly more uniform, both in the direction of the X axis (part b) of FIG. 10), and in the direction of the Y axis (part c) of FIG. 10).

The comparison between, on one hand, FIGS. 7 and 8 and, on the other hand, FIGS. 9 and 10 (especially the latter) may seem at first sight counter-intuitive: considering the diagrams of FIGS. 7 and 8 in fact, illuminance peaks would be expected on the plane S of FIG. 10 at the angles where the intensity assumes the maximum value.

However, for the relation that links the light intensity $I(\theta)$ with the illuminance E, the latter is scaled with the square of the distance between the source and the illuminated element on the plane S (distance that varies rapidly as the angle increases), and then projected onto the element area.

As illustrated in greater detail below, intensity ($I(\theta)$) (function of the angle $\theta$ with respect to the axis X102) and projected illuminance E are, in fact, linked by a relation of the type:

$$E = I(\theta) \cdot \cos(\theta)/d^2.$$

For a fixed height H between the illuminating device (e.g. lens+source) that emits the light intensity $I(\theta)$ and the element of the lighted plane along the same angle $\theta$, the distance d may be expressed as:

$$d = H/\cos(\theta)$$

and, therefore, replacing it in the previous one:

$$E = (I(\theta) \cdot \cos(\theta)^3/H^2.$$

Thus, between (projected) illuminance and intensity $I(\theta)I$, there is a scale factor $\cos(\theta)^3$ that varies from 1 to 0 very rapidly as a function of the angle $\theta$.

Therefore, in order to obtain a substantially uniform illuminance on the lighted plane S, to compensate for this effect, the intensity $I(\theta)$ is increased at least as rapidly, as a function of the angle, and this is possible thanks to the presence of side peaks of the type of those observable in the graphs of FIGS. 7 and 8.

Figure 11:
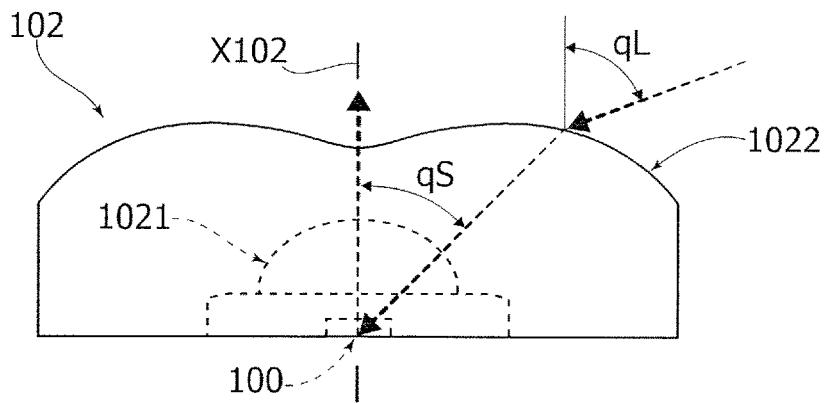

FIG. 11 and subsequent FIGS. illustrate possible adoptable criteria for choosing the configuration and/or the dimensioning of a lens such as the lens 102.

Figure 12:
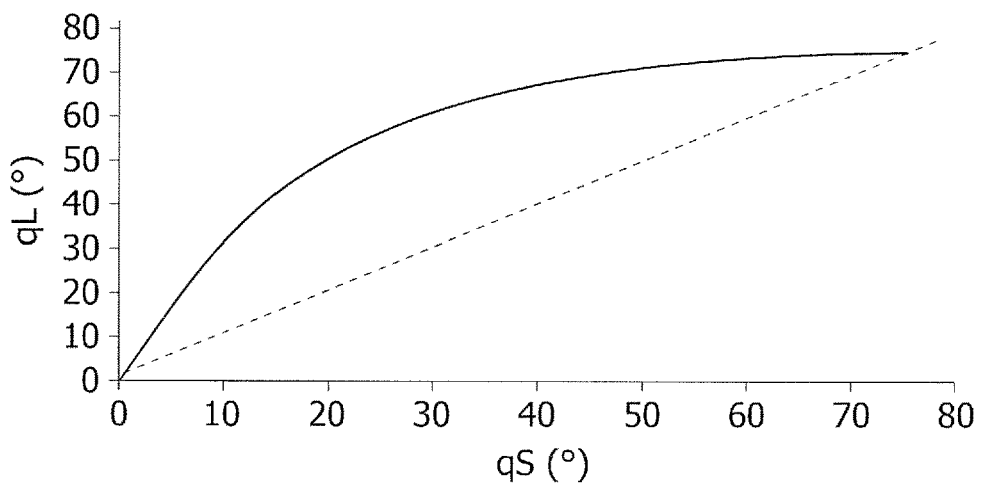
Figure 13:
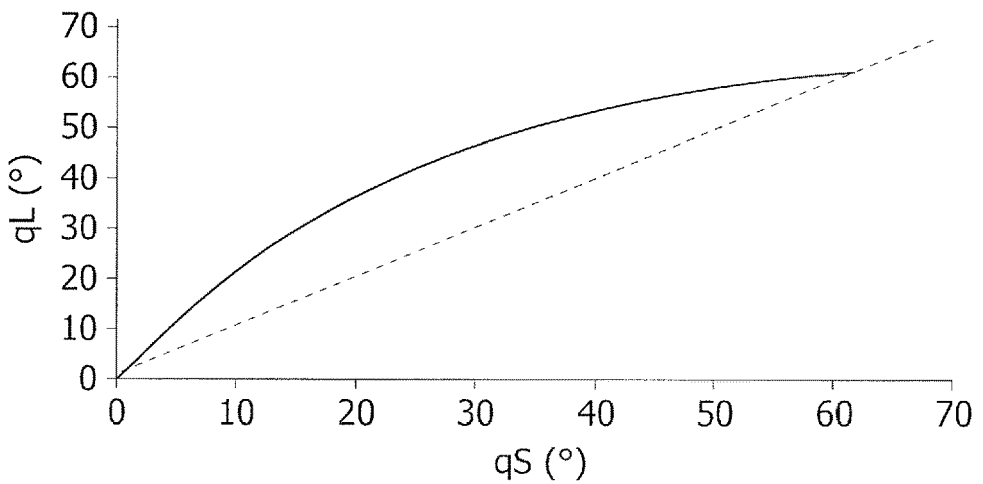

In particular, FIGS. 11 to 13 refer to possible values of the emission angles of the light radiation starting from the radiation generator (for example LED 100—angle qS) and at the output from the surface 1022 of the lens 102 (angle qL). The aforesaid angles refer to the optical axis X102 already defined above.

In particular, the diagrams of FIGS. 12 and 13 exemplify the dependence of the angle qL (ordinate scale) with respect to the input angle qS (abscissa scale), respectively:

in the longitudinal direction, i.e. the alignment direction of the convex portions 1022a, 1022b—diagram of FIG. 12, and in the transversal direction—diagram of FIG. 13).

It is possible to observe that the overall behavior is—to a certain extent—similar to that described, for example, in FIGS. 6 to 8 of the patent document U.S. Pat. No. 7,348,723 B2, already cited above.

However, unlike what was previously described in this earlier document, in the case considered here qL is always greater than qS, even when qS is near the optical axis (angles ≤5°): this applies both in the longitudinal direction and in the transverse direction.

The observation of the diagrams of FIGS. 12 and 13 also indicates the presence of a limit angle value (equal to about 75° in the longitudinal direction and about 60° in the transverse direction) in which this rule no longer applies, as the light radiation emitted from the generator 100 impacts on the side vertical walls of the lens (i.e. it no longer impacts the free-form output surface 1022).

One or more non-limiting embodiments may be based on the recognition of the fact that creating, for example, by means of a lens, a flat illuminance field on a reference surface does not allow the desired result to be achieved if, at the same time, illuminating the side walls of the box is desired in such a way that, for example, the plants on the plane S receive correct illuminance even while they are growing, being located close to the walls of the box.

In principle, one could think of designing a lens capable of uniformly illuminating a greater reference plane than the desired one. By proceeding in this way, parts of the light radiation at the most distant ends of the lighting field may actually arrive at the walls of the box. However, this solution does not allow the desired result to be achieved as the back-reflected light from the side walls on the plane S causes the illuminance on this plane to be non-uniform.

Below, possible criteria may be used to define the characteristics of the lens 102 in order to allow uniform illuminance of the reference plane (also) to be obtained when the light radiation generators 100 and the lenses 102 are placed inside a box 10 provided with reflective side walls 141, 142, for example with Lambertian behavior.

The considerations expressed hereafter refer to a box such as the box 10 exemplified in FIGS. 1 and 2 assuming that the plane S is at a distance H with respect to the upper wall where the light radiation sources are located (array 18).

Figure 14:
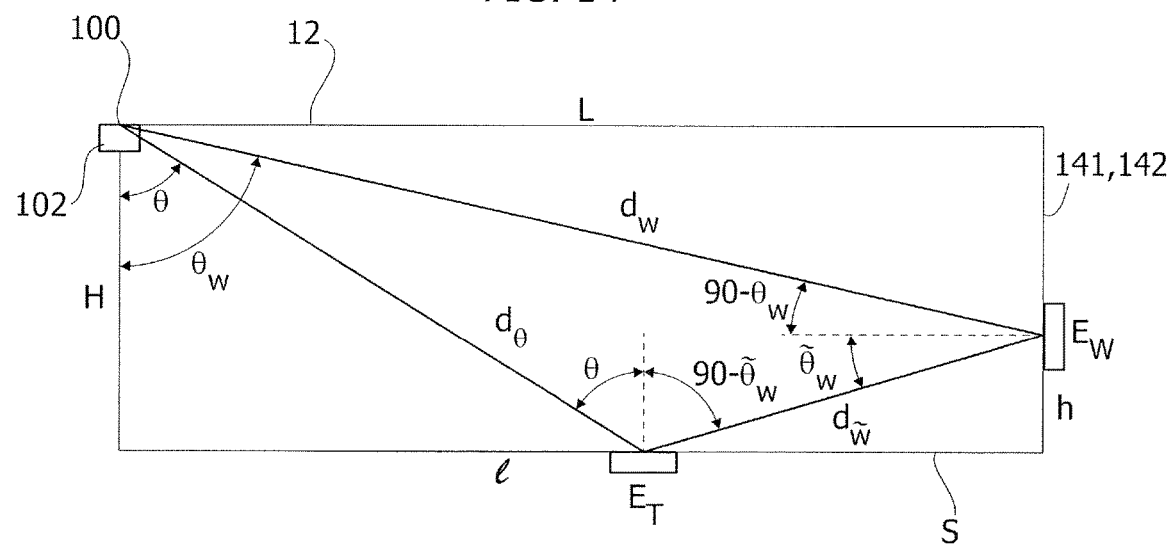

The following analytical treatment refers (see FIG. 14) to one of the two halves in which the box 10 may be ideally subdivided assuming that the other half of the box (not shown in FIG. 14) exhibits specularly symmetrical behavior with respect to the vertical line on the left of FIG. 14 where the lighting source is assumed to be positioned (generator, for example LED, 100 and lens 102).

The light radiation coming from the lens 102 follows two different paths, by propagating inside the box 10.

A first path directly impacts a surface element $E_T$ of the reference plane S, while a second path impacts the side walls (141, 142, on the right of the FIG. 14) to be reflected backwards and impact the surface element $E_T$ on the reference plane S.

For simplicity, it may be assumed that the plane S is perfectly absorbent: this hypothesis is realistic because this plane is covered by the culture medium—for example soil for plants—and may, therefore, be considered an absorbing surface with a good approximation.

The relation between the illuminance $E_W$ projected on a plane according to the intensity distribution at the angle $\theta_W$ may be expressed in the form:

$$E_W = \frac{I(\theta_W)\cos(90-\theta_W)}{d_W^2}$$

where $I(\theta_W)$ is the intensity of the light leaving the lens 102 at the angle $\theta_W$, $E_W$ is the illuminance on the plane of the wall and $d_W$ is the distance between the source and the wall element.

The brilliance of a wall with Lambertian behavior lighted by a lighting source may be expressed as:

$$L_W = \rho \frac{E_W}{\pi}$$

where $\rho$ is the reflectivity of the wall surface.

In the simplified model considered here, the total illuminance on the element of the reference plane $E_T$ is given by the sum of the two illuminance components:

$$E_\tau = E_S + E_{\tilde{W}} = \frac{I(\theta)\cos(\theta)}{d_\theta^2} + \sum_{\theta_W=\theta_{min}}^{\theta_{max}} \frac{\tilde{I}(\tilde{\theta}_W)\cos(90-\tilde{\theta}_W)}{d_{\tilde{W}}^2}$$

where $E_S$ is the illuminance provided by only the lighting source and by the lens and $E_{\tilde{W}}$ is the illuminance provided by the back-reflected light coming from the wall element.

The term $E_{\tilde{W}}$ is generally quite complicated because it takes into account the fact that the incident light on the single receiving surface element ($E_T$) as back-reflected from the walls derives, in principle, from each small surface element of the wall (positioned at a height between 0 and H).

Consequently, the light coming from the source that impacts on the side walls and is then back-reflected on the same receiving surface element $E_T$ is added to all possible angles $\tilde{\theta}_W$. The distance between the element $E_T$ and $E_{\tilde{W}}$ is $d_{\tilde{W}}$:

Taking into account the relation between the reflectivity of the wall and the intensity that impacts the wall, $\tilde{I}(\tilde{\theta}_W)$ may be expressed in the form:

$$\tilde{I}(\tilde{\theta}_W) = \rho \frac{E_W}{\pi} A_W \cos(\tilde{\theta}_W) = \rho \frac{I(\theta_W)\cos(90-\theta_W)}{\pi d_W^2} A_W \cos(\tilde{\theta}_W)$$

where $A_W$ is the area element.

Combining all the equations seen previously, the overall illuminance collected by the receiving surface element, $E_T$, may be expressed as:

$$E_\tau = E_S + E_{\tilde{W}}$$
$$= \frac{I(\tilde{\theta})\cos(\theta)}{d^2} +$$
$$\sum_{\theta_W=\theta_{min}}^{\theta_{max}} \rho \frac{I(\theta_W)\cos(90-\theta_W)}{\pi d_W^2} A_W \cos(\tilde{\theta}_W) \frac{\cos(90-\tilde{\theta}_W)}{d_{\tilde{W}}^2}$$

or $$E_\tau = \frac{I(\theta)\cos(\theta)}{d^2} + \sum_{\theta_W=\theta_{min}}^{\theta_{max}} I(\theta_W) P(\theta, \theta_W)$$

where a propagation factor $P(\theta,\theta_W)i$ of the intensity has been introduced defined as:

$$P(\theta, \theta_W) = \frac{\rho A_W}{\pi d_W^2 d_{\tilde{W}}^2} \cos(90-\theta_W)\cos(\tilde{\theta}_W)\cos(90-\tilde{\theta}_W)$$
$$= \frac{\rho A_W}{2\pi d_W^2 d_{\tilde{W}}^2} \sin(\theta_W)\sin(2\tilde{\theta}_W)$$

which may be considered as a weighting factor that indicates how much of the intensity that impacts the wall coming from the source, below an angle $\theta_W$, contributes to increase the illuminance on the element $E_T$ (identified by the angle $\theta$) on the reference plane after being back-reflected from the wall.

Due to the relation between the angle $\tilde{\theta}_W$ and the distance $d_{\tilde{W}}$ $$d_{\tilde{W}} = \frac{h}{\sin(\tilde{\theta}_W)}$$

and to the fact that, for simplicity, only a fixed position on the wall surface is considered, it is possible to write:

$$P(\theta,\theta_W) = k\cos(\tilde{\theta}_W)\sin^3(\tilde{\theta}_W),$$

where the constant k has been introduced:

$$k = \frac{\rho A_W}{\pi h^2 d_W^2} \sin(\theta_W).$$

Therefore the total illuminance may be expressed as:

$$E_\tau = E_S + E_{\tilde{W}} = \frac{I(\theta)\cos(\theta)}{d_\theta^2} + kI(\theta_W)\cos(\tilde{\theta}_W)\sin^3(\tilde{\theta}_W)$$

where $\theta_W$ is the angle followed by the light coming from the source towards the wall element.

Despite this simplified description, the equation of the total illuminance is still rather complicated to evaluate. It would, in fact, be desirable to have an expression that depends only on one angle ($\theta$).

In this regard it may be observed that the angles $\theta$ and $\theta_W$ are limited by the size of the box 10: it may be seen that, being, $$\theta = \arctan\left(\frac{l}{H}\right)$$

and $$\tilde{\theta}_W = \arctan\left(\frac{h}{L-l}\right)$$

you have $$\tan(\tilde{\theta}_W) = \frac{h}{L - h\tan(\theta)}$$

so that the propagation factor $P(\theta,\theta_W)i$ becomes a function of only the angle $\theta$:

$$P(\theta, \theta_W) = k\cos(\tilde{\theta}_W)\sin^3(\tilde{\theta}_W)$$

$$= k\frac{h^3}{(L - h\tan(\theta))^3\left(1 + \frac{h^2}{(L - h\tan(\theta))^2}\right)}$$

and $$E_\tau = \frac{I(\theta)\cos(\theta)}{d_\theta^2} + kI(\theta_W)\frac{h^3}{(L - h\tan(\theta))^3\left(1 + \frac{h^2}{(L - h\tan(\theta))^2}\right)}.$$

It is possible to derive the equation for the intensity distribution of the light source when uniform illumination of the reference plane is required without considering the presence of the walls.

This relation may be easily derived from the expression seen above for $E_S$, imposing it to be a constant:

$$E_S = \bar{k} = \frac{I(\theta)\cos(\theta)}{d_\theta^2}$$

Figure 16:
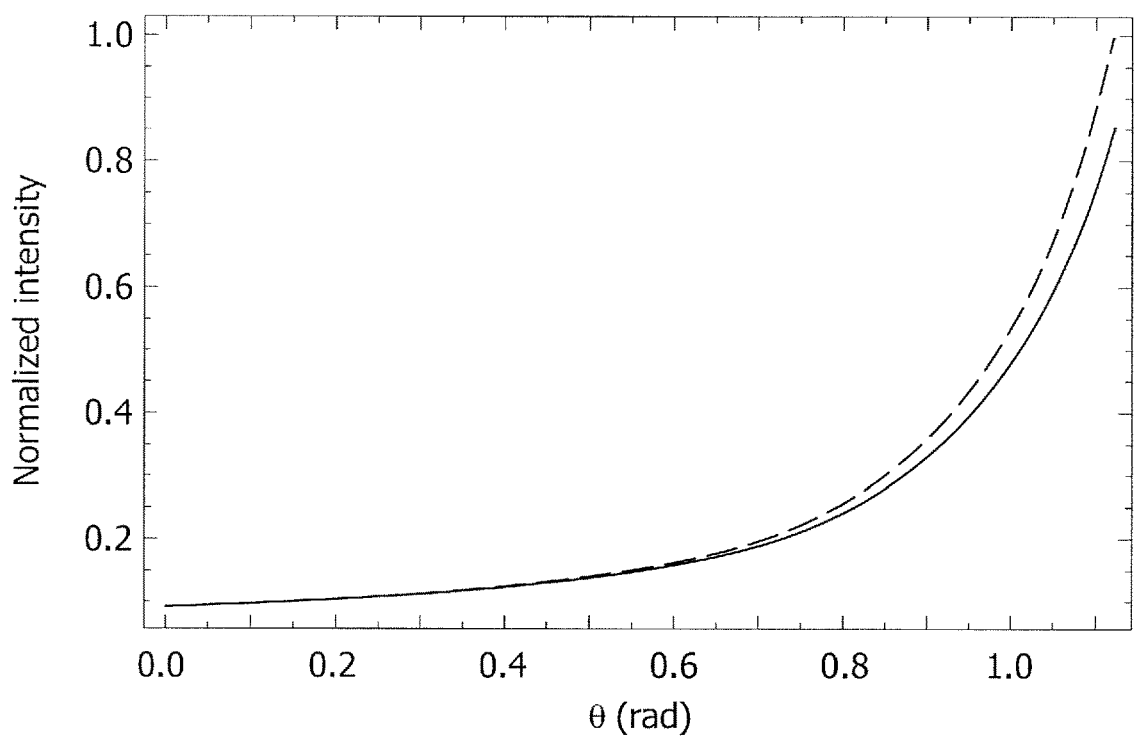

Solving with respect to $I(\theta)$ we obtain (see the dashed graph in FIG. 16)

$$I(\theta) = \frac{\bar{k}H^2}{\cos^3(\theta)}$$

where the following identity was used:

$$\frac{H}{d_\theta} = \cos(\theta).$$

This particular intensity distribution makes it possible to better understand why a lens that generates it would not be—in itself—usable in a case like the one considered here.

Figure 15:
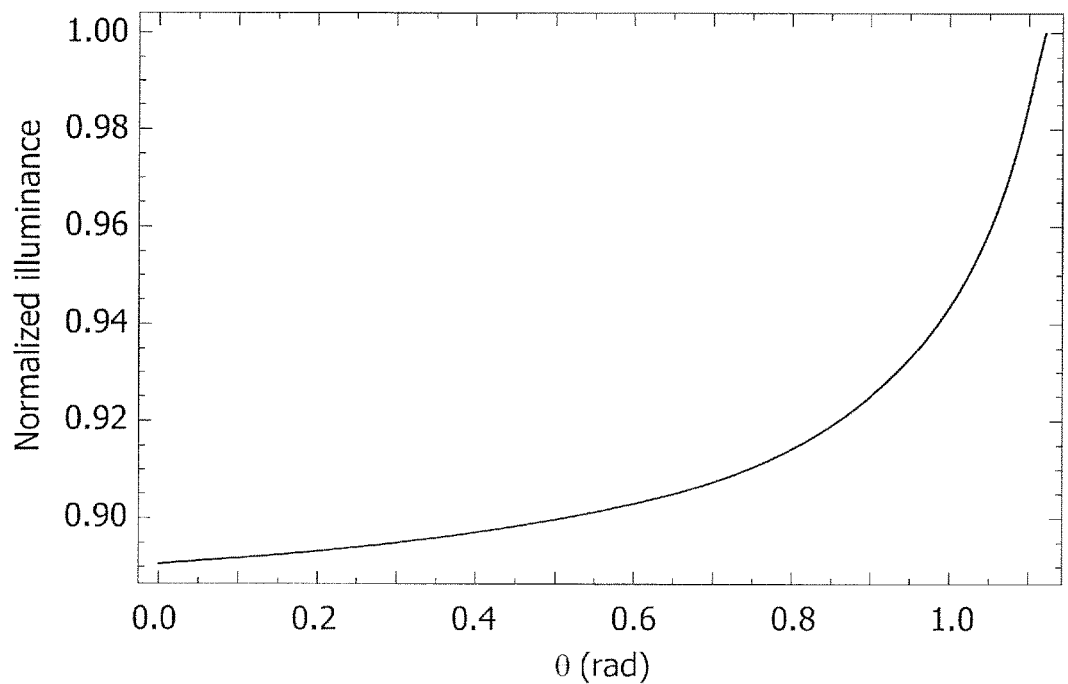

In fact, if we also consider the simple condition in which only one element of the wall reflects the light towards the reference plane S, the total distribution of illuminance on the reference plane S could be expressed in the form:

$$E_T(\theta) = E_S(\theta) + E_{\tilde{W}}(\theta)$$

$$= \frac{I(\theta)\cos^3(\theta)}{H^2} + kI(\theta_W)\frac{h^3}{(L - h\tan(\theta))^3\left(1 + \frac{h^2}{(L - h\tan(\theta))^2}\right)}$$

that is, in the form of a constant term $E_S(\theta)$ and a term $E_{\tilde{W}}(\theta)$ that increases as the wall is gradually approached, as exemplified, for example, in FIG. 15 (Normalized Illuminance) as a function of the angle $\theta$, expressed in radians.

This figure is an exemplary diagram of the distribution of normalized illuminance (ordinate scale) on the reference plane, obtainable inside the box 10 using an intensity distribution according to a constant illuminance outside the box. The diagram shows that the illuminance distribution increases as the edge of the box 10 is gradually approached, due to the back-reflection of light from the walls.

Conversely, when a constant illuminance distribution on the reference plane S is required (independent of $\theta$), the same relation suggests a possible choice for the intensity distribution starting from the lens 102, that is:

$$I(\theta) = \frac{H^2}{\cos^3(\theta)}\left[E_T - kI(\theta_W)\frac{h^3}{(L - h\tan(\theta))^3\left(1 + \frac{h^2}{(L - h\tan(\theta))^2}\right)}\right]$$

where $E_T$ is kept constant on the reference plane S (i.e. that is the same, independent of $\theta$).

The diagram in FIG. 16 exemplifies possible trends in the distribution of Normalized Intensity as a function of the angle $\theta$, expressed in radians and obtainable with a constant illuminance source outside the box 10 (dashed-line diagram) and inside the box 10 (continuous-line diagram).

Figure 17:
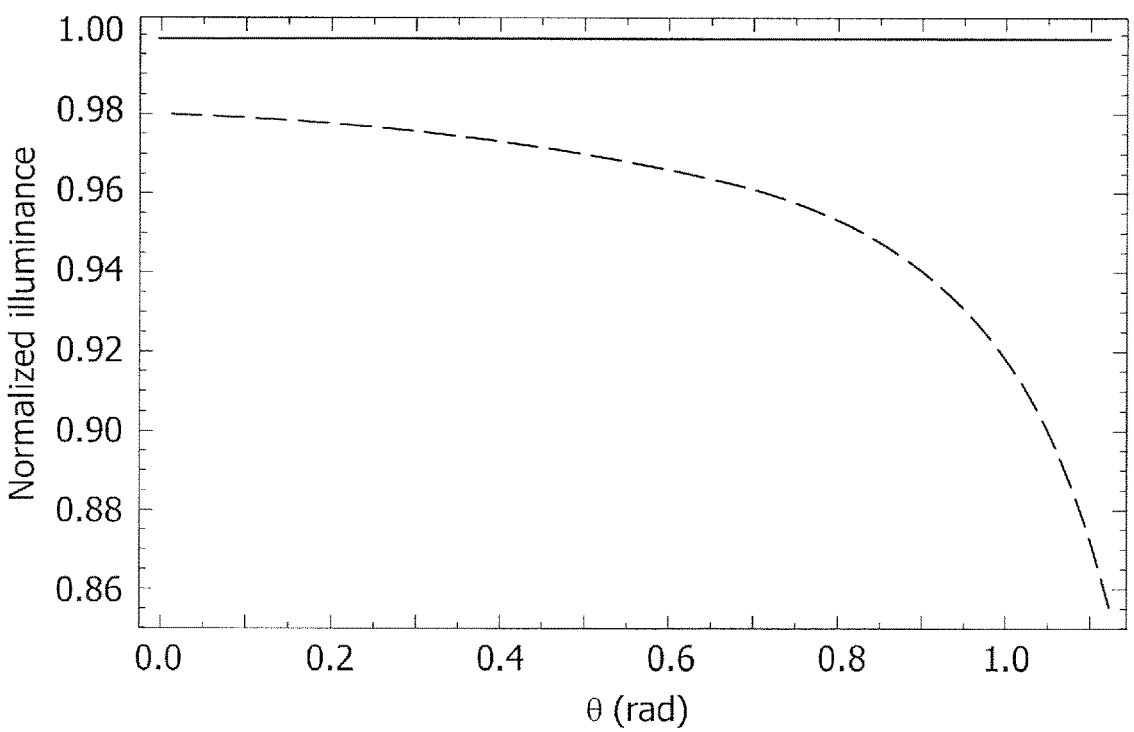

By evaluating the term $E_S(\theta)$ using this intensity distribution, it is possible to obtain the diagram indicated with a dashed line in FIG. 17.

This diagram shows that, if you do not consider the box 10 (i.e. if you reason without taking into account the side walls 141, 142), the illuminance distribution (Normalized Illuminance) as a function of the angle $\theta$, expressed in radians, obtainable on the reference plane S is not flat but gradually decreases from the center towards the edge of the box.

On the other hand, if this intensity distribution is placed inside the box 10 (with the side walls 141, 142 that reflect the light towards the plane S), the illuminance distribution on the reference plane becomes substantially flat, as exemplified by the continuous-line diagram at the top in FIG. 17.

This figure illustrates (in ordinate) the illuminance distribution normalized in the reference plane S obtainable starting from a source like the one previously considered using the intensity distribution seen previously on the outside of the box (dashed-line diagram) compared with the normalized illuminance obtained when this intensity distribution is used inside the box 10 (continuous line diagram).

The observation of the preceding diagrams and the analytical treatment previously carried out provide criteria for making the lens 102 in such a way that the intensity distribution gradually increases as the light beam impacts the reference surface S between the central position (arranged perpendicularly below the surface of the lens 102) and the outer region limited by the side walls. This is compared to the distribution that allows a uniform illuminance field (flat) in the same region to be obtained.

The intervention law of this variation factor may be determined according to various parameters, such as, for example, the reflectivity of the walls.

It will be appreciated, however, that the treatment provided previously is of a simplified nature, due to various aspects:
- it only considers the contribution of a single wall of the box 10, when in reality there are contributions coming from all the walls of the box 10,
- it only considers the illuminance contribution of a single wall element kept fixed starting from a certain point onwards, when in reality there is a summing effect of all the elements of the same wall,
- it only considers a two-dimensional model, when in reality there are illuminance contributions from all the wall elements of each wall,
- it does not take into account the effects of the presence of several lenses (see for example FIG. 3) and of multiple reflections of the light on the various walls of the box 10.

However, it has been verified that this simplified model also allows completely satisfactory results to be obtained.

In addition to this, by creating the surfaces of the lens 102 so as to best approximate the required theoretical intensity distribution, it is possible to obtain a lens conformation (such as the one illustrated in FIGS. 4 to 6) capable of providing a good degree of uniformity on the reference plane S for the entire array 18.

A lens such as the lens 102 exemplified above has an asymmetric profile (if considered with reference to the cylindrical symmetry profile of traditional lenses). The optical power coming from such a lens has, however, a certain degree of symmetry with a radiation pattern of a certain type in one direction (for example, in the direction of the lens length, for example, the longitudinal alignment direction of the convexities 1022a, 1022b) and a different radiation pattern in a transverse direction (for example, in the direction perpendicular to the aforesaid longitudinal direction).

This fact may be appreciated, for example, by examining the distribution of light intensity coming from a single lens as exemplified in the diagrams of FIGS. 7 and 8.

In these figures, it may be seen that the intensity distribution in the longitudinal direction is represented in the dashed line, while the intensity distribution in the perpendicular direction is represented by the continuous curve.

It is possible to see that achieving a uniformly illuminated surface within a box 10 (with the dimensions indicated above by way of example) may be facilitated by an intensity distribution increasing monotonically from the center (0°) towards side peaks having values of 75° (and 60°, respectively) and then decreasing monotonically towards higher angle values (for example) 90° above the peak.

As for the possible distribution of the lighting sources (generators, for example, LEDs 100 and lenses 102) in the array 18, as already said previously, in one or more embodiments, the generators 100 may differ from each other by different parameters such as spectrum, flux value and radiation pattern.

In one or more non-limiting embodiments it is possible to distribute generators 100 with different colors/powers in a (pseudo)random fashion in an array 18. However, this may make it more difficult to achieve complete color uniformity on the illuminated surface (plane S): it cannot be excluded that LEDs of the same color end up being accidentally grouped at a portion of the array.

In one or more non-limiting embodiments it may be possible to distribute the generators 100 on the basis of a balanced sequence so as to facilitate obtaining uniformity of color and flux.

Assuming, by way of example, that LEDs of four different types are available, identified as LED1, LED2, LED3, LED4, these LEDs may be distributed in a linear array according to a law of the type . . . , LED3, LED2, LED1, LED4, LED3, LED2, LED1, LED4 . . . and so on.

Figure 18:
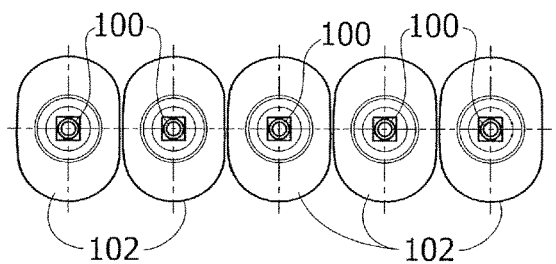
FIGS. 18 to 20 illustrate various possibilities of assembling light radiation sources in embodiments, and FIG. 21, comprising three portions indicated, respectively, with a), b) and c), is an example of possible variants of embodiments.

In one or more non-limiting embodiments it may be possible to adopt a uniform distribution for both the generators 100 and the lenses 102 associated therewith, as exemplified in FIG. 18, with uniform spacing both of the generators 100 and of the lenses 102.

Figure 19:
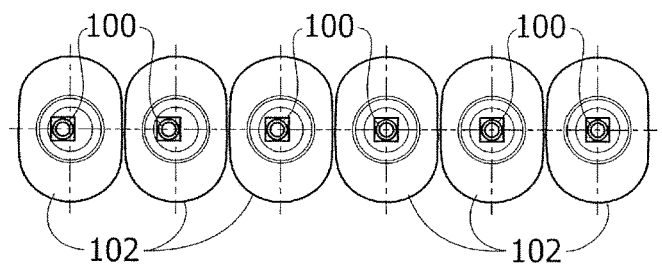

In one or more non-limiting embodiments as exemplified in FIG. 19, it is possible to envisage that, with uniformly-spaced lenses 102, the generators 100 are spaced in an uneven manner so that one or more of the generators 100 may be placed in an eccentric position with respect to the respective lens 102.

In this way, it is possible to implement "regulation" actions of the uniformity in terms of color and lighting according to the needs of application and use, without changing the shape of the lenses.

Figure 20:
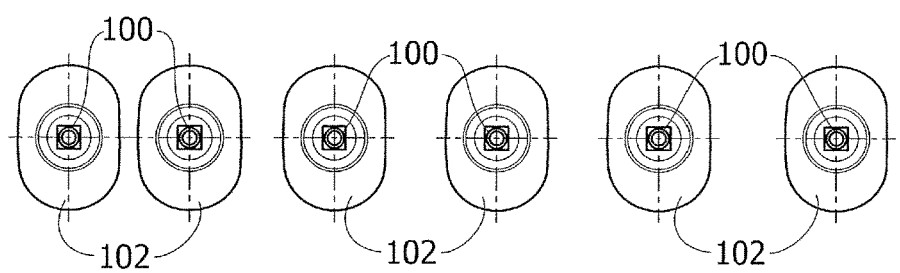

In one or more non-limiting embodiments, as exemplified in FIG. 20, similar results may be achieved by maintaining the mounting position of the lenses 102 centered with respect to the generators 100, but using an uneven spacing of the individual sources (generator 100-lens 102).

Considerations such as those exemplified with reference to FIGS. 18 to 20 apply to both linear arrays and matrix arrays comprising several lines or rows.

Using multiple lines or rows (or possibly even several arrays), it is possible to further improve the uniformity effect by distributing the sources differently in the various rows/arrays according to certain color sequences or with the same sequence of colors offset from one row/array to another (for example, using the same sequence for different rows, but starting the sequence with a different color LED in each row from that of the adjacent row).

One or more non-limiting embodiments may possibly envisage the use of different lenses 102 so as to be able to modify the radiation emission intensity profile, for example, by placing peak values at different values (for example, changing them from 75° to 50° or less) so as to increase the lighting power at particular spatial regions. In this case, it is possible to use one or more arrays to uniformly illuminate the surface S, but envisaging the presence of arrays intended to illuminate certain regions more intensely.

A solution of this type may be used, for example, when the side walls 141, 142 of the box 10 are different from each other, for example, with a transparent or semi-transparent wall (for example, of glass or Plexiglas) so as to have a degree of reflectivity (even much) lower than that of the other walls.

In this case, it is possible to use lenses 102 that concentrate the light intensity in the vicinity of these less-reflecting walls (for example a glazed wall).

The diagram of FIG. 21 refers, according to methods substantially similar to those of FIG. 10, to the possibility of using asymmetrical lens profiles 102, at least in one direction, so as to have, for example, a substantially uniform illuminance in the X direction of the reference plane S and a (less) uniform distribution in the direction of the Y axis in such a way that, for example, the portion of the plane S illustrated above in part a) of FIG. 21 is more intensely illuminated than the part shown below, where one may assume, for example, a semi-transparent wall such as a glass window is present).

One or more non-limiting embodiments may provide, instead of the reduction (for example from 75° to 50°), an increase (for example from 75° to 80° or greater) of the angle value in which there is a peak of emission intensity, so as to also partially illuminate the walls of the box 10.

A solution of this type may be adopted, for example, to concentrate the lighting on plants at a more advanced stage of growth.

In one or more non-limiting embodiments, the lenses 102 may have not only an optical function but also a mechanical function.

For example, a lens such as the lens 102 exemplified above may have grooves (e.g., grooves, which surround the input surface 1021) for positioning sealing elements or for accommodating electrical components (e.g., electronic components such as SMD components) capable of cooperating with the generators 100. These may be components such as resistors, integrated circuits, and so on.

In this way, it is possible to also use the body of the lens 102 as a covering element of the lighting device (fixture), since it is thus possible to reduce the number of components to be mounted together and also increase the efficiency of light emission.

In one or more non-limiting embodiments it is also possible to apply an (inner or outer) coating on the lenses 102 to increase efficiency (which could be, for example, an anti-reflective coating) or to strengthen the surface, making it less sensitive to scratching, attack with solvents and so on.

In one or more non-limiting embodiments, the lens 102 may also take on a protection task against the penetration of external agents (for example, with a degree of IP protection).

An installation (e.g. 10) according to one or more embodiments may comprise:
- a lighting space between a lighted plane (e.g. S) and a lighting plane (e.g. 12) parallel to the lighted plane with side walls (e.g. 141, 142), which are at least partly light-reflective,
- a set (e.g. 18) of light radiation sources (e.g. 100, 102) arranged centrally relative to the lighting plane and projecting (emitting) light radiation towards the lighted plane in the direction of a (main) radiation emission axis (X102), wherein the light radiation from the light radiation sources has a distribution of illuminance projected towards the lighted plane (e.g. S) that is non-uniform and gradually decreases as a function of the angle (θ) relative to the radiation emission axis (e.g. X102), the reflection of the radiation on the side walls (e.g. 141, 142) facilitates uniform illuminance at the lighted plane.

In other words, in one or more non-limiting embodiments, the light radiation of the light radiation sources may have a illuminance distribution projected towards the plane S so that, if—no—side walls are present (such as the walls 141 and 142), there would be a non-uniform illuminance distribution on the lighted plane S, with a decreasing trend as a function of the angle θ with respect to the main emission direction. In one or more embodiments, the presence of walls 142, 143, which reflect the radiation towards the plane S, is instead such as to facilitate obtaining—at the lighted plane (note S)—a uniform illuminance.

In one or more non-limiting embodiments, this result is achievable with an intensity distribution I(θ) that is non-uniform and gradually increases as a function of the angle (θ), which may be expressed according to a relation like the one discussed above by way of example $$I(\theta) = \frac{H^2}{\cos^3(\theta)}\left[E_\tau - kI(\theta_W)\frac{h^3}{(L-h\tan(\theta))^3\left(1+\frac{h^2}{(L-h\tan(\theta))^2}\right)}\right]$$

or according to a similar relation.

In this way, in one or more non-limiting embodiments, it is possible to compensate the contribution of the reflection of the radiation on the side walls (141, 142) facilitating a uniform illuminance E(θ) at the lighted plane (S).

In one or more non-limiting embodiments, the light radiation sources in the set may comprise:
- a light radiation generator (e.g. 100), optionally with LEDs, and
- a lens (102) (see, for example, qS, qL in FIGS. 11 to 13) for shaping the intensity pattern of the light radiation emitted by the light radiation generator (100).

In one or more non-limiting embodiments the lens may include an optical axis (e.g. X102), a light radiation input surface (e.g. 1021) facing the light radiation generator and a light radiation output surface (e.g. 1022) facing the lighted plane, wherein the radiation leaving the output surface of the lens forms, with respect to the optical axis, an output angle (e.g. qL) greater than the input angle (e.g. qS) formed, with respect to the optical axis, by radiation entering the input surface of the lens.

In one or more non-limiting embodiments, the lens may include a dome-shaped light radiation input surface and a light radiation output surface including a pair of convex portions (e.g. 1022a, 1022b) with a concavity (e.g. 1023) therebetween, the concavity aligned with the dome-shaped input surface.

In one or more non-limiting embodiments the concavity between the convex portions may present a median plane with the specularly convex portions symmetric with respect to the median plane.

In one or more non-limiting embodiments, the lens may be mechanically coupled to the light radiation generator, optionally with an interposed seal and/or associated electrical components.

In one or more non-limiting embodiments, the set of light radiation sources may comprise at least one linear array of light radiation sources.

In one or more non-limiting embodiments, the convex portions of the output surface of the lens may be transversely aligned relative to the direction of extension of the at least one linear array of light radiation sources.

One or more non-limiting embodiments may comprise a parallelepiped lighting space with a first (e.g., 141) and a second (e.g., 142) pair of mutually opposite side walls.

In one or more non-limiting embodiments, at least one linear array may extend parallelly to one of the pairs of side walls.

In one or more non-limiting embodiments, the set of light radiation sources may comprise equally spaced sources (see, for example, FIG. 18).

In one or more non-limiting embodiments, the set of light radiation sources may comprise light radiation sources that differ from one another by at least one of the following:
- the emission spectrum,
- the value of the emitted light flux,
- the light emission pattern, the spacing relative to neighboring light radiations sources in the set.

Figure 21:
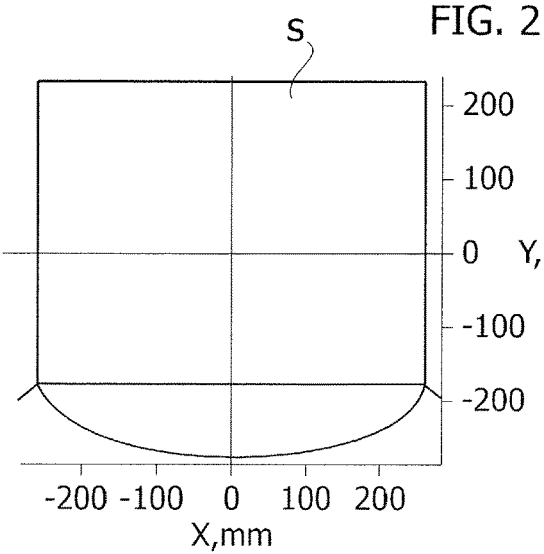
Figure 21:
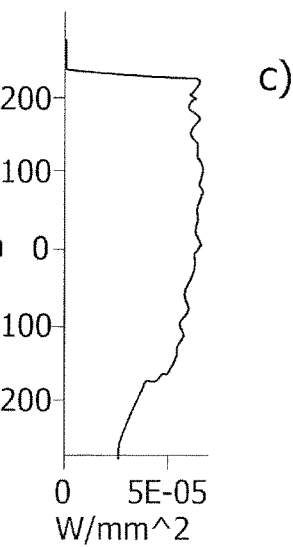
Figure 21:
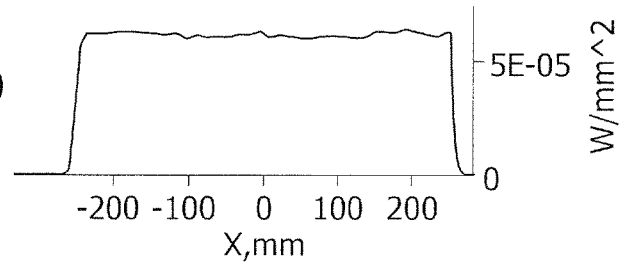

In one or more non-limiting embodiments:

at least one of the side walls has a light reflectivity lower than the other side walls, and the non-uniform projected illuminance distribution may decrease non-symmetrically with a smaller decrease at the at least one wall with lower light reflectivity (see e.g. FIG. 21).

One or more non-limiting embodiments may comprise a culture medium filling for vegetables (e.g. P in FIG. 2), the surface of the culture medium defining the lighted plane.

A method according to one or more non-limiting embodiments may comprise:

providing a lighting space between a lighted plane and a lighting plane parallel to the lighted plane with side walls, which are at least partly light-reflective, arranging a set of light radiation sources centrally relative to the lighting plane, which project light radiation towards the lighted plane in the direction of a (main) radiation emission axis, shaping (e.g. by means of the lenses 102) the distribution of the light radiation from the light radiation sources as an illuminance distribution projected towards the lighted plane, which is non-uniform and gradually decreasing as a function of the angle ($\theta$) relative to the radiation emission axis (X102), the reflection of radiation on the side walls (141, 142) facilitates uniform illuminance at the lighted plane (S).

In one or more non-limiting embodiments of this method, the light radiation of the light radiation sources may have an intensity distribution that is non-uniform and gradually increases as a function of the angle relative to the radiation emission axis.

Without prejudice to the underlying principles of the invention, the details of construction and the embodiments may vary, even significantly, with respect to those illustrated here, purely by way of non-limiting example, without departing from the scope of the invention.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCE SIGNS

Installation 10
Lighted plane S
Lighting plane 12
Side walls 141, 142
Set of sources 18
Radiation emission axis X102
Angle $\theta$
Light radiation generator 100
Lens 102
Input surface 1021
Output surface 1022
Output angle qL
Input angle qS
Convex portions 1022a, 1022b
Concavity 1023

What is claimed is:

1. An installation comprising:
a lighting space between a lighted plane and a lighting plane parallel to the lighted plane with side walls, wherein the side walls are at least partly light-reflective,
a set of light radiation sources arranged centrally relative to the lighting plane and projecting light radiation towards the lighted plane in the direction of a radiation emission axis,
a lens arranged over one or more light radiation sources of the set of light radiation sources; wherein the lens is configured to have light radiation emitted from the lens that has a distribution of illuminance projected towards the lighted plane that is non-uniform and gradually decreases as a function of the angle relative to the radiation emission axis, wherein the reflection of the radiation on the side walls facilitates uniform illuminance at the lighted plane; wherein the lens further comprises an optical axis, a light radiation input surface facing the light radiation generator and a light radiation output surface facing the lighted plane, wherein radiation leaving the output surface of the lens forms, with respect to the optical axis, an output angle greater than the input angle formed, with respect to the optical axis, by light radiation entering the input surface of the lens.

2. The installation of claim 1, wherein the lens is further configured to have light radiation emitted therefrom having an intensity distribution, wherein the intensity distribution is non-uniform and gradually increases as a function of the angle relative to the radiation emission axis.

3. The installation of claim 1, wherein the light radiation sources in the set comprise a light radiation generator.

4. The installation of claim 1, wherein the lens further comprises a dome-shaped light radiation input surface and a light radiation output surface comprising a pair of convex portions with a concavity therebetween, the concavity being aligned with the dome-shaped input surface.

5. The installation of claim 4, wherein the concavity between the convex portions comprises a median plane with the convex portions specularly symmetrical with respect to the median plane.

6. The installation of claim 3, wherein the lens is mechanically coupled to the light radiation generator, preferably with a seal therebetween and/or electrical components associated therewith.

7. The installation of claim 1, wherein the set of light radiation sources further comprises at least one linear array of light radiation sources.

8. The installation of claim 4, wherein the set of light radiation sources further comprises at least one linear array of light radiation sources, and wherein the convex portions of the output surface of the lens are transversally aligned relative to the direction of extension of the at least one linear array of light radiation sources.

9. The installation of claim 1, further comprising a parallelepiped lighting space with a first and a second pair of mutually opposite side walls.

10. The installation of claim 9, wherein the set of light radiation sources further comprises at least one linear array of light radiation sources, and wherein the at least one linear array extends parallelly to one of the pairs of side walls.

11. The installation of claim 8, further comprising a parallelepiped lighting space with a first and a second pair of mutually opposite side walls, wherein the at least one linear array extends parallelly to one of the pairs of side walls.

12. The installation of claim 1, wherein the set of light radiation sources further comprises sources equally spaced therebetween.

13. The installation of claim 1, wherein the set of light radiation sources includes sources that differ from each other by at least one of the following:
   the emission spectrum,
   the value of the emitted light flux,
   the light emission pattern,
   the spacing relative to neighboring light radiations sources in the set.

14. The installation of claim 1, wherein:
   at least one of the side walls has a light reflectivity lower than the other side walls, and
   a non-uniform projected illuminance distribution decreases non-symmetrically with a smaller decrease at the at least one wall with lower light reflectivity.

15. The installation of claim 1, further comprising a filling of a growth medium for vegetables, the surface of the growth medium defining the lighted plane.

16. A method comprising:
   providing a lighting space between a lighted plane and a lighting plane parallel to the lighted plane with side walls that are at least partly light-reflective,
   arranging a set of light radiation sources centrally relative to the lighting plane, which project light radiation towards the lighted plane in the direction of a radiation emission axis,
   arranging a lens over one or more light radiation sources of the set of light radiation sources; wherein the lens is configured to have light radiation emitted from the lens that has a distribution of illuminance projected towards the lighted plane, which is non-uniform and gradually decreasing as a function of the angle relative to the radiation emission axis, wherein the reflection of radiation on the side walls facilitates uniform illuminance at the lighted plane; wherein the lens further comprises an optical axis, a light radiation input surface facing the light radiation generator and a light radiation output surface facing the lighted plane, wherein radiation leaving the output surface of the lens forms, with respect to the optical axis, an output angle greater than the input angle formed, with respect to the optical axis, by light radiation entering the input surface of the lens.

17. The method of claim 16, wherein the lens is further configured to have light radiation emitted therefrom having an intensity distribution, wherein the intensity distribution is non-uniform and gradually increasing as a function of the angle relative to the radiation emission axis.

18. An installation comprising:
   a lighting space between a lighted plane and a lighting plane parallel to the lighted plane with side walls, wherein the side walls are at least partly light-reflective;
   a set of light radiation sources arranged centrally relative to the lighting plane and projecting light radiation towards the lighted plane in the direction of a radiation emission axis,
   wherein the set of light radiation sources includes sources that differ from each other by at least one of the following:
      the emission spectrum,
      the value of the emitted light flux,
      the light emission pattern, and
      the spacing relative to neighboring light radiations sources in the set;
   a lens arranged over one or more light radiation sources of the set of light radiation sources; wherein the lens is configured to have the light radiation emitted from the lens that has a distribution of illuminance projected towards the lighted plane that is non-uniform and gradually decreases as a function of the angle relative to the radiation emission axis, wherein the reflection of the radiation on the side walls facilitates uniform illuminance at the lighted plane.

19. The installation of claim 18, wherein the lens is asymmetric.

* * * * *